(12) United States Patent
Yoshino

(10) Patent No.: US 9,120,199 B2
(45) Date of Patent: Sep. 1, 2015

(54) POLISHING LIQUID COMPOSITION

(75) Inventor: Taiki Yoshino, Wakayama (JP)

(73) Assignee: Kao Corporation, Tokyo (JP)

( * ) Notice: Subject to any disclaimer, the term of this patent is extended or adjusted under 35 U.S.C. 154(b) by 842 days.

(21) Appl. No.: 13/314,397

(22) Filed: Dec. 8, 2011

(65) Prior Publication Data

US 2012/0077422 A1   Mar. 29, 2012

(30) Foreign Application Priority Data

Dec. 9, 2010 (JP) .................................. 2010-274767
Sep. 20, 2011 (JP) .................................. 2011-204409

(51) Int. Cl.
| B24B 37/04 | (2012.01) |
| C09G 1/02 | (2006.01) |
| C09K 3/14 | (2006.01) |
| C09K 13/06 | (2006.01) |

(52) U.S. Cl.
CPC ............... *B24B 37/044* (2013.01); *C09G 1/02* (2013.01); *C09K 3/1463* (2013.01); *C09K 13/06* (2013.01)

(58) Field of Classification Search
CPC   B24B 37/044; C09K 3/1463; H01L 21/3212; C09G 1/02
USPC ...................... 451/36, 41; 438/691, 692, 693; 252/79.1, 79.2; 257/E21.304; 51/293, 51/307
See application file for complete search history.

(56) References Cited

U.S. PATENT DOCUMENTS

| 6,391,423 | B1 * | 5/2002 | Sato et al. ...................... 428/141 |
| 6,440,856 | B1 | 8/2002 | Bessho et al. |
| 6,641,630 | B1 | 11/2003 | Sun |
| 8,273,142 | B2 * | 9/2012 | White et al. ...................... 51/307 |
| 2003/0013386 | A1 * | 1/2003 | Weinstein et al. .............. 451/41 |
| 2004/0065021 | A1 | 4/2004 | Yoneda et al. |
| 2006/0030243 | A1 | 2/2006 | Nishimoto et al. |
| 2006/0216936 | A1 * | 9/2006 | Akatsuka ...................... 438/691 |
| 2007/0066065 | A1 * | 3/2007 | Sugiyama ...................... 438/691 |
| 2007/0200089 | A1 * | 8/2007 | Inaba et al. ................... 252/79.1 |
| 2008/0006057 | A1 | 1/2008 | Nishimoto et al. |
| 2008/0086951 | A1 | 4/2008 | Wakamiya et al. |
| 2008/0131571 | A1 | 6/2008 | Nakayama et al. |
| 2009/0042169 | A1 * | 2/2009 | Kintrup et al. .............. 433/217.1 |
| 2009/0194504 | A1 * | 8/2009 | Sato et al. ........................ 216/53 |
| 2009/0239450 | A1 * | 9/2009 | Ishida et al. ...................... 451/41 |
| 2010/0233880 | A1 | 9/2010 | Wang et al. |
| 2011/0203186 | A1 | 8/2011 | Oshima et al. |
| 2011/0240594 | A1 | 10/2011 | Hamaguchi et al. |
| 2013/0032571 | A1 * | 2/2013 | Doi et al. ........................ 216/38 |
| 2013/0171824 | A1 * | 7/2013 | Li et al. .......................... 438/693 |

FOREIGN PATENT DOCUMENTS

| CN | 1809620 A | 7/2006 |
| CN | 101588895 A | 11/2009 |
| JP | 2001-64631 A | 3/2001 |
| JP | 2001-212443 A | 8/2001 |
| JP | 2004-27224 A | 1/2004 |
| JP | 2004-143429 A | 5/2004 |
| JP | 2006-102829 A | 4/2006 |
| JP | 2006-136996 A | 6/2006 |
| JP | 2007-231209 A | 9/2007 |
| JP | 2008-13655 A | 1/2008 |
| JP | 2008-137822 A | 6/2008 |
| JP | 2008-155368 A | 7/2008 |
| JP | 2008-169102 A | 7/2008 |
| JP | 2008-227098 A | 9/2008 |
| JP | 2008-296318 A | 12/2008 |
| JP | 2010-135052 A | 6/2010 |
| JP | 2010-170650 A | 8/2010 |
| JP | 2010-188514 A | 9/2010 |
| JP | 2012-136416 A | 7/2012 |
| TW | 201031738 A1 | 9/2010 |
| WO | WO 2004/094547 A2 | 11/2004 |
| WO | WO 2007/108925 A2 | 9/2007 |

OTHER PUBLICATIONS

International Search Report, dated Jan. 26, 2010 in PCT/JP2009/071160.
Mori, "The particle diameter distribution measurement of nanoparticles by the dynamic light scattering method", The 20th workshop on scattering, Doshisha University, Dec. 4, 2008, pp. 5-4-5-7.
Shibayama, "Dynamic light scattering", The 12th workshop on scattering, Inst. for Solid State Physics, The University of Tokyo, Nov. 22, 2000, pp. 1-24-1-27.
Chinese Office Action and Search Report, mailed Apr. 3, 2014, for Chinese Application No. 201110396859.5, including a partial English translation thereof.
The Office Action, dated Jun. 2, 2015, issued in the corresponding Japanese Patent Application No. 2011-204409.
The Office Action, dated May 7, 2015, issued in the corresponding Taiwanese Patent Application No. 10045364.

\* cited by examiner

*Primary Examiner* — Eileen Morgan
(74) *Attorney, Agent, or Firm* — Birch, Stewart, Kolasch & Birch, LLP

(57) ABSTRACT

A polishing liquid composition that makes it possible to provide a polished substrate surface on which scratches and/or waviness are reduced, without impairing productivity, is provided, and further, a method for manufacturing and polishing a substrate using this polishing liquid composition is provided. The polishing liquid composition contains an abrasive, a water-soluble polymer, and water, wherein the water-soluble polymer has a sulfonic acid group, and has an aromatic ring in each of a main chain and a side chain. The method for manufacturing a substrate, and the method for polishing a substrate, include performing polishing by supplying the above-described polishing liquid composition to a surface to be polished of a substrate to be polished, bringing a polishing pad into contact with the surface to be polished, and moving the polishing pad and/or the substrate to be polished.

32 Claims, No Drawings

POLISHING LIQUID COMPOSITION

TECHNICAL FIELD

The present invention relates to a polishing liquid composition, and to a method for manufacturing a substrate using the polishing liquid composition.

BACKGROUND ART

Recently, the downsizing and the capacity expansion of magnetic disk drives have been promoted, and higher recording density has been demanded. In order to increase the recording density, a unit recording area is reduced, and in order to improve the sensitivity for detection of a magnetic signal weakened thereby, techniques for decreasing the floating amount of the magnetic head are being developed. In order to decrease the floating amount of a magnetic head and ensure recording areas, a magnetic disk substrate has to fulfill severer requirements, such as the improvement of smoothness and flatness typified by the reduction of surface roughness, waviness, and edge rounding, as well as the reduction of defects typified by the reduction of scratches, projections, pits, etc. To cope with these requirements, a polishing liquid composition containing a copolymer having a functional group such as a carboxyl group or a sulfonic acid group has been proposed (e.g., JP 2010-135052 A, and JP 2010-170650 A).

JP 2010-135052 A discloses an abrasive composition that uses an anionic surfactant having a repeat unit and a sulfonic acid (salt) group in a molecule, and further having an aromatic group in a main chain of the repeat unit, thereby enabling reduction of defects such as scratches, and enabling efficient polishing since foaming less in a polishing process.

JP 2010-170650 A discloses a polishing liquid composition for magnetic disk substrates that contains a water-soluble polymer having an anionic group, and thereby making it possible to provide a polished substrate with reduced scratches and surface roughness, without impairing productivity.

SUMMARY OF THE INVENTION

The present invention in one aspect relates to a polishing liquid composition containing an abrasive, a water-soluble polymer, and water, wherein the water-soluble polymer has a sulfonic acid group, and has an aromatic ring in each of a main chain and a side chain.

The present invention in another aspect relates to a method for manufacturing a substrate or a method for polishing substrate, the method including the step of performing polishing by supplying the polishing liquid composition of the present invention to a surface to be polished of a substrate to be polished, bringing a polishing pad into contact with the surface to be polished, and moving the polishing pad and/or the substrate to be polished.

DETAILED DESCRIPTION OF THE INVENTION

Conventional polishing liquid compositions have improved properties of polishing liquids regarding foaming and regarding scratches. Requirements that the substrate should fulfill regarding surface quality, however, have become severer, with the increase in a magnetic disk drive capacity. Therefore, development of a polishing liquid composition that enables the reduction of scratches and waviness of substrate surfaces without impairing the productivity is desired.

The present invention provides a polishing liquid composition that makes it possible to provide a polished substrate surface on which scratches and waviness are reduced, without impairing the productivity, and a method for manufacturing a magnetic disk substrate using the foregoing polishing liquid composition.

The present invention in one aspect relates to a polishing liquid composition containing an abrasive, a water-soluble polymer, and water, wherein the water-soluble polymer has a sulfonic acid group, and has an aromatic ring in each of a main chain and a side chain.

The present invention in another aspect relates to a method for manufacturing a substrate or a method for polishing substrate, the method including the step of performing polishing by supplying the polishing liquid composition of the present invention to a surface to be polished of a substrate to be polished, bringing a polishing pad into contact with the surface to be polished, and moving the polishing pad and/or the substrate to be polished.

With the polishing liquid composition of the present invention, it is possible to achieve the following effect: it is possible to manufacture a substrate, preferably a magnetic disk substrate, or more preferably a magnetic disk substrate of a perpendicular magnetic recording system having a polished substrate surface on which waviness as well as scratches are reduced, without impairment of productivity.

The present invention is based on the knowledge that if a polishing liquid composition that contains a water-soluble polymer having a sulfonic acid group, and having an aromatic ring in each of a main chain and a side chain is used, since the polishing liquid foams less, it is possible to provide a polished substrate surface on which scratches and waviness are reduced, even though a high polishing rate is maintained.

More specifically, the present invention relates to a polishing liquid composition (hereinafter referred to also as "the polishing liquid composition of the present invention") containing an abrasive, a water-soluble polymer, and water, wherein the water-soluble polymer has a sulfonic acid group, and has an aromatic ring in each of a main chain and a side chain (hereinafter the polymer is referred to also simply as "the water-soluble polymer").

Details of the mechanism of the polishing liquid composition of the present invention that foams less and makes it possible to provide a polished substrate surface on which not only scratches but also waviness are reduced, even though a polishing rate is maintained high, have not been clarified yet, but the following is presumed: the aromatic rings of the main chain and the side chain of the water-soluble polymer are adsorbed to the polishing pad with an appropriate adsorption force and the sulfonic acid group of the water-soluble polymer forms a hydration layer on the polishing pad surface, and as a result, friction vibration between the polishing pad and the substrate to be polished is reduced, whereby scratches and waviness of the substrate surface are reduced. The mechanism of the present invention, however, is not limited to the above-described mechanism.

[Water-Soluble Polymer]

The water-soluble polymer used in the polishing liquid composition of the present invention has a sulfonic acid group, and has an aromatic ring in each of a main chain and a side chain of the water-soluble polymer. Here, the term "water-soluble" implies such a degree of solubility that 2 g or more is dissolved in 100 g of water at 20° C. The "main chain" refers to, in the water-soluble polymer, the longest portion of the straight chain structure formed with monomer units bonded, and the "side chain" refers to a portion branched out of the straight chain. Regarding the "sulfonic acid group", those in a salt form also fall in this category.

The water-soluble polymer can be produced by polymerization of a chemical compound having a sulfonic acid group that will be described later, and a chemical compound that is capable of introducing aromatic rings to both of the main chain and the side chain of the polymer, in the presence of formaldehyde by a known method such as addition condensation. From the viewpoint of the improvement of anti-hydrolytic properties and the improvement of preservation stability in an acidic polishing liquid, the water-soluble polymer is preferably produced by addition condensation. Therefore, an exemplary preferable embodiment of the water-soluble polymer is a water-soluble copolymer having a constituent unit that is a repeat unit having an aromatic ring in each of a main chain and a side chain thereof and a constituent unit having a sulfonic acid group (hereinafter referred to also simply as "water-soluble copolymer"). An exemplary embodiment of the water-soluble copolymer is a water-soluble copolymer produced by subjecting a chemical compound capable of introducing aromatic rings to both of the main chain and the side chain of the water-soluble copolymer, and a chemical compound having a sulfonic acid group, to addition condensation in the presence of formaldehyde.

Examples of the chemical compound that is capable of introducing aromatic rings to both of the main chain and the side chain of the water-soluble copolymer include: 2,2'-bis (4-hydroxyphenyl)propane (bisphenol A), bis(4-hydroxyphenyl)cyclohexane, (bisphenol C), bis(4-hydroxyphenyl) methane (bisphenol F), bis(4-hydroxyphenyl)sulfone (bisphenol S), 2,3-dihydroxynaphthalene, 9,10-anthracene diol, bis(3-methyl-4-hydroxyphenyl)sulfone, bis(3,5-dimethyl-4-hydroxyphenyl)sulfone, and bis(3,5-dibromo-4-hydroxyphenyl)sulfone. Among these, from the viewpoint of improving solubility in water, the viewpoint of preventing decrease in a polishing rate, and the viewpoint of reducing scratches and waviness of the substrate surface, 2,2'-bis(4-hydroxyphenyl)propane (bisphenol A), bis(4-hydroxyphenyl)cyclohexane, (bisphenol C), bis(4-hydroxyphenyl)methane (bisphenol F), bis(4-hydroxyphenyl)sulfone (bisphenol S), bis(3-methyl-4-hydroxyphenyl)sulfone, bis(3,5-dimethyl-4-hydroxyphenyl)sulfone, and bis(3,5-dibromo-4-hydroxyphenyl)sulfone are preferred; 2,2'-bis(4-hydroxyphenyl)propane (bisphenol A), bis(4-hydroxyphenyl) cyclohexane (bisphenol C), bis(4-hydroxyphenyl)methane (bisphenol F), bis(4-hydroxyphenyl)sulfone (bisphenol S), bis(3-methyl-4-hydroxyphenyl)sulfone, and bis(3,5-dimethyl-4-hydroxyphenyl)sulfone are more preferred; 2,2'-bis (4-hydroxyphenyl)propane (bisphenol A), bis(4-hydroxyphenyl)cyclohexane, (bisphenol C), bis(4-hydroxyphenyl) methane (bisphenol F), bis(4-hydroxyphenyl)sulfone (bisphenol S), and bis(3-methyl-4-hydroxyphenyl)sulfone are further preferred; and bis(4-hydroxyphenyl)methane (bisphenol F), and bis(4-hydroxyphenyl)sulfone (bisphenol S) are still further preferred.

Examples of the chemical compound having a sulfonic acid group include polyalkyl aryl sulfonic acid-based compounds such as 4-hydroxybenzene sulfonic acid, 4-hydroxy-1-naphthalene sulfonic acid, 5-hydroxy-1-naphthalene sulfonic acid, 8-hydroxy-5-quinoline sulfonic acid, naphthalene sulfonic acid, methyl naphthalene sulfonic acid, and anthracene sulfonic acid; melamine resin sulfonic acid-based compounds such as melamine sulfonic acid; lignin sulfonic acid-based compounds such as lignin sulfonic acid, and modified lignin sulfonic acid; aromatic aminosulfonic acid-based compounds such as amino aryl sulfonic acid; and salts of these compounds. Among these, from the viewpoint of improving the solubility in the acidic polishing liquid, improving the preservation stability of the copolymer, and the reduction of scratches and waviness of the substrate surface, 4-hydroxybenzene sulfonic acid, 4-hydroxy-1-naphthalene sulfonic acid, 5-hydroxy-1-naphthalene sulfonic acid, 8-hydroxy-5-quinoline sulfonic acid, and salts of these compounds are preferred; 4-hydroxybenzene sulfonic acid, 4-hydroxy-1-naphthalene sulfonic acid, 5-hydroxy-1-naphthalene sulfonic acid, and salts of these compounds are more preferred; and 4-hydroxybenzene sulfonic acid, and salts of the compound are further preferred.

[Constituent Unit A]

The water-soluble copolymer preferably has a constituent unit A expressed by the following general formula (I) as a constituent unit having an aromatic ring in each of the main chain and the side chain (hereinafter referred to also simply as "constituent unit A"), from the viewpoint of promoting the efficient adsorption to the polishing pad, reducing the friction vibration between the polishing pad and the substrate to be polished, and reducing waviness of the substrate surface. The constituent unit A can be introduced into the water-soluble copolymer by using a chemical compound that allows aromatic rings to be introduced into both of the main chain and the side chain.

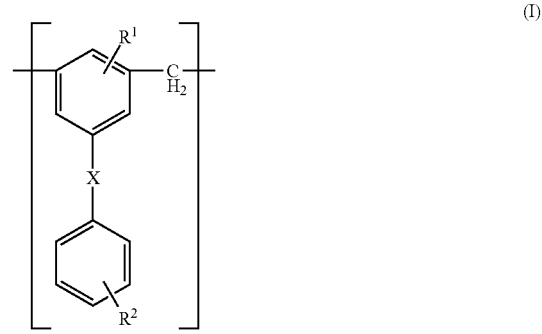

(I)

In the formula (I), X represents a bond, —$CH_2$—, —S—, —$SO_2$—, —$C(CH_3)_2$—, or

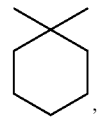

$R^1$ and $R^2$ are identical or different to/from each other and represent a hydrogen atom, an alkyl group, an alkoxy group, an aralkyl group, or —OM, and M is selected from the group consisting of alkali metals, alkali earth metals, organic cations, and a hydrogen atom.

In the formula (I), X is preferably —$CH_2$—, —S—, —$SO_2$—, or —$C(CH_3)_2$— from the viewpoint of reducing the foaming of the polishing liquid composition; X is more preferably —$CH_2$— or —$SO_2$— from the viewpoint of reducing the shedding by the polishing pad and reducing waviness of the substrate surface; and X is further more preferably —$SO_2$— from the viewpoint of reducing scratches.

In the formula (I), $R^1$ and $R^2$ are identical or different to/from each other, and each is preferably a hydrogen atom, an alkyl group, an alkoxy group, or —OM from the viewpoint of facilitating the industrial production; it is more preferably a hydrogen atom, —OM, or an alkoxy group from the viewpoint of reducing the foaming of the polishing liquid; from the viewpoint of reducing scratches it is still more preferably an alkoxy group or —OM, and further more preferably —OM. The substitution site of $R^1$ and $R^2$ is not limited particularly, but it is preferable that it has a substitution group at a 4,4'-site, from the viewpoint of industrial productivity. M represents an alkali metal, an alkali earth metal, an organic cation, or a hydrogen atom, as described above. Examples of the organic cation include ammonium, and alkyl ammoniums such as tetramethyl ammonium, tetraethyl ammonium, and tetrabutyl ammonium. Among these, an alkali metal, ammonium, or a hydrogen atom is preferably used from the viewpoint of reducing scratches and waviness, more preferably, sodium, potassium, ammonium or a hydrogen atom is used, and still more preferably a hydrogen atom is used. In other words, —OH is most preferably used as $R^1$ and $R^2$.

The content of the constituent unit A in the entire constituent units composing the water-soluble copolymer is preferably 5 to 70 mol %, more preferably 5 to 60 mol %, still more preferably 5 to 50 mol %, further more preferably 10 to 45 mol %, still further more preferably 10 to 40 mol %, and still further more preferably 20 to 40 mol %, from the viewpoint of suppressing the foaming of the polishing liquid composition and reducing scratches and waviness of the substrate surface.

It should be noted that, in the present specification, as the content (mol %) of a certain constituent unit in the entire constituent units composing the water-soluble copolymer, the amount (mol %) that a chemical compound charged in the reaction vessel in order to introduce the constituent unit accounts for in the total amount of chemical compounds charged in the reaction vessel in order to introduce the entire constituent units through the entire process of synthesis of the water-soluble copolymer may be used, depending on the synthesis conditions. Further, in the present specification, as the constitution ratio (molar ratio) of certain two constituent units composing the water-soluble copolymer, the amount ratio (molar ratio) of chemical compounds charged in the reaction vessel in order to introduce the two constituent units through the entire process of synthesis of the water-soluble copolymer may be used, depending on the synthesis conditions.

[Constituent Unit B]

The water-soluble copolymer preferably has a constituent unit B expressed by the following general formula (II) (hereinafter referred to also simply as "constituent unit B") from the viewpoint of improving the solubility of the water-soluble copolymer in an acidic polishing liquid, and reducing scratches and waviness of the substrate surface. The constituent unit B can be introduced into the water-soluble copolymer by using the above-described chemical compound having a sulfonic acid group.

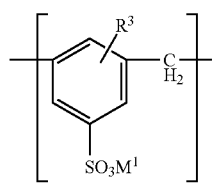

(II)

In the formula (II), $R^3$ represents a hydrogen atom, an alkyl group, an alkoxy group, an aralkyl group, or —OM$^2$, and $M^1$ and $M^2$ may be identical or different to/from each other, and are selected from the group consisting of alkali metals, alkali earth metals, organic cations, and a hydrogen atom.

In the formula (II), $R^3$ preferably represents a hydrogen atom, an alkyl group, an alkoxy group, or —OM$^2$, more preferably a hydrogen atom, an alkoxy group, or —OM$^2$, still more preferably a hydrogen atom, an alkoxy group, or —OM$^2$, still more preferably an alkoxy group or —OM$^2$, and further more preferably —OM$^2$, from the viewpoint of improving the preservation stability in an acidic polishing liquid, suppressing the foaming of the polishing liquid, and reducing scratches and waviness of the substrate surface. The substitution site of $R^3$ is not limited particularly, but is preferably located at a para position with respect to the sulfonic acid group from the viewpoint of improving the reaction properties upon the production of the copolymer. $M^1$ and $M^2$ are, independently from each other, selected from the group consisting of alkali metals, alkali earth metals, organic cations, and a hydrogen atom. Examples of the organic cation include ammonium and alkyl ammoniums such as tetramethyl ammonium, tetraethyl ammonium, and tetrabutyl ammonium. Among these, an alkali metal, ammonium or a hydrogen atom is preferable, and sodium, potassium, ammonium, or a hydrogen atom is more preferable, from the viewpoint of improving the solubility in an acidic polishing liquid, and reducing the surface roughness and scratches.

The content of the constituent unit B in the entire constituent units composing the water-soluble copolymer is preferably 30 to 95 mol %, more preferably 40 to 95 mol %, still more preferably 50 to 95 mol %, further more preferably 55 to 90 mol %, still further more preferably 60 to 90 mol %, and still further more preferably 60 to 80 mol % from the viewpoint of improving the solubility in an acidic polishing liquid, reducing scratches and waviness of the substrate surface, and improving the polishing rate.

[Other Constituent Unit]

The water-soluble copolymer may have a constituent unit other than the constituent units A and B. The content of the other constituent unit in the entire constituent units composing the water-soluble copolymer is preferably 0 to 30 mol %, more preferably 0 to 20 mol %, still more preferably 0 to 10 mol %, further more preferably 0 to 5 mol %, still further more preferably, substantially 0 mol %, from the viewpoint of providing a polished substrate surface on which scratches, nano-projection defects, and waviness are reduced.

The molar ratio between the constituent unit A and the constituent unit B in the entire constituent units composing the water-soluble copolymer (constituent unit A/constituent unit B) is preferably 70/30 to 5/95, more preferably 60/40 to 5/95, still more preferably 50/50 to 5/95, further more preferably 45/55 to 10/90, still further more preferably 40/60 to 10/90, still further more preferably 35/65 to 15/85, still further more preferably 35/65 to 20/80, and still further more preferably 35/65 to 25/75, from the viewpoint of suppressing a decrease in the polishing rate, suppressing the foaming of the polishing liquid, and reducing scratches and waviness of the substrate surface. It should be noted that the arrangement of the constituent units A and B may be any one of random arrangement, block arrangement, and graft arrangement, but random arrangement is preferred from the viewpoint of suppressing the generation of friction vibration.

[Surface Tension of Watersoluble Copolymer]

The water-soluble copolymer has a surface tension of preferably 45 to 100 mN/m, more preferably 50 to 90 mN/m, still more preferably 55 to 80 mN/m, further more preferably 65 to 75 mN/m, and still further more preferably 68 to 72 mN/m, from the viewpoint of suppressing the generation of friction vibration caused by the shedding by the polishing pad, and reducing waviness of the substrate surface. It should be noted that the surface tension can be determined by a method mentioned in the description of Examples.
[Weight Average Molecular Weight of Watersoluble Polymer]

The watersoluble polymer has a weight average molecular weight of preferably, 500 to 120000, more preferably 1000 to 100000, still more preferably 1000 to 50000, further more preferably 1500 to 40000, still further more preferably 3000 to 40000, still further more preferably 4500 to 40000, still further more preferably 5000 to 40000, still further more preferably 8000 to 30000, still further more preferably 10000 to 25000, and still further more preferably 10000 to 20000, from the viewpoint of providing a polished substrate surface on which scratches and waviness are reduced, without impairment of the productivity. The weight-average molecular weight is a value determined by gel permeation chromatography (GPC) under the conditions mentioned in the description of Examples.

[Content of Water-Soluble Polymer]

The content of the water-soluble polymer in the polishing liquid composition of the present invention is preferably 0.001 to 1 wt %, more preferably 0.003 to 0.5 wt %, still more preferably 0.005 to 0.2 wt %, further more preferably 0.007 to 0.15 wt %, still further more preferably 0.01 to 0.1 wt %, still furthermore preferably 0.01 to 0.07 wt %, and still further preferably 0.01 to 0.05 wt %, from the viewpoint of providing a polished substrate surface on which scratches and waviness are reduced, without impairment of the productivity. It should be noted that, in the present specification, the "content of a component contained in the polishing liquid composition" refers to the content of the component at the time when the polishing liquid composition is used for polishing. Therefore, in the case where the polishing liquid composition of the present invention is produced as a condensed product, the content of the component can increase according to the condensation.

[Residual Monomer Content in Water-Soluble Polymer]

The content of formaldehyde as a residual monomer in the water-soluble polymer is preferably 0 ppm, or in a range of more than 0 ppm and not more than 10000 ppm, more preferably 0 ppm, or in a range of more than 0 ppm and not more than 6000 ppm, still more preferably 0 ppm, or in a range of more than 0 ppm and not more than 5000 ppm, further more preferably 0 ppm, or in a range of more than 0 ppm and not more than 3000 ppm, still further more preferably 0 ppm, or in a range of more than 0 ppm and not more than 2000 ppm, and still further more preferably 0 ppm, or in a range of more than 0 ppm and not more than 1000 ppm, from the viewpoint of providing a polished substrate surface on which scratches are reduced. The content of residual formaldehyde is a value determined by high performance liquid chromatography (HPLC) under the conditions mentioned in the description of Examples. Residual formaldehyde may be reduced by causing reaction thereof with a sulfite, hydrogen cyanide or a salt thereof ammonium hydroxide, alcohol, or the like by a known method.

[Content of Formaldehyde in Polishing Liquid Composition]

The content of formaldehyde in the polishing liquid composition is preferably 0.00 pm, or in a range of more than 0.00 pm and not more than 10.0 ppm, more preferably 0.00 ppm, or in a range of more than 0.00 ppm and not more than 5.0 ppm, still more preferably 0.00 ppm, or in a range of more than 0.00 ppm and not more than 4.0 ppm, still more preferably, 0.00 ppm, or in a range of more than 0.00 ppm and not more than 3.0 ppm, further more preferably 0.00 ppm, or in a range of more than 0.00 ppm and not more than 1.0 ppm, still further more preferably 0.00 ppm, or in a range of more than 0.00 ppm and not more than 0.55 ppm, still further more preferably 0.00 ppm, or in a range of more than 0.00 ppm and not more than 0.5 ppm, still further more preferably 0.00 ppm, or in a range of more than 0.00 ppm and not more than 0.4 ppm, and still further more preferably 0.00 ppm, or in a range of more than 0.00 ppm and not more than 0.1 ppm, from the view point of providing a polished substrate surface on which scratches are reduced. The content of formaldehyde in the polishing liquid composition can be determined by high performance liquid chromatography (HPLC) in the same manner as described above.

[Abrasive]

As the abrasive used in the polishing liquid composition of the present invention, any abrasives generally employed for polishing can be used. Examples of the abrasive include metals; carbides, nitrides, oxides, or borides of metals or metalloids; diamond, and the like. The metal elements or metalloid elements include those elements belonging to the Groups 2A, 2B, 3A, 3B, 4A, 4B, 5A, 6A, 7A or 8 of the Periodic Table (long period form). Concrete examples of the abrasive include silicon oxide (hereinafter referred to as "silica"), aluminum oxide (hereinafter referred to as "alumina"), silicon carbide, diamond, manganese oxide, magnesium oxide, zinc oxide, titanium oxide, cerium oxide (hereinafter referred to as "ceria"), and zirconium oxide. It is preferable to use one or more kinds of these abrasives, from the viewpoint of increasing the polishing rate. Among them, silica, alumina, titanium oxide, ceria, zirconium oxide, and the like are suitable for polishing substrates for precision parts such as substrates for semiconductor elements and substrates for magnetic disks. Furthermore, colloidal silica, colloidal ceria, and colloidal alumina are preferable, among which colloidal silica is more preferable, from the viewpoint of reducing surface roughness and reducing scratches.

[Average Particle Size of Abrasive]

The "average particle size of an abrasive" in the present specification refers to an average particle size based on a scattering intensity distribution determined at a detection angle of 90° by dynamic light scattering, unless otherwise provided particularly (hereinafter this is also referred to as "average particle size based on scattering intensity distribution"). The average particle size of an abrasive is preferably 1 to 40 nm, more preferably 5 to 37 nm, and further more preferably 10 to 35 nm, from the viewpoint of providing a polished substrate surface on which scratches are reduced. It should be noted that specifically the average particle size of an abrasive can be determined by a method mentioned in the description of Examples.

The abrasive has a $\Delta CV$ value of preferably, 0.001 to 10%, more preferably 0.01 to 9%, still more preferably 0.01 to 7%, and further more preferably 0.01 to 5%, from the viewpoint of providing a polished substrate surface on which scratches and waviness are reduced, and the viewpoint of improving the productivity of the polishing liquid composition.

[$\Delta CV$ Value]

The $\Delta CV$ value of the abrasive in the present specification refers to a value of a difference ($\Delta CV = CV30 - CV90$) between the following two values CV30 and CV90, which indicates the angle dependency of a scattering intensity distribution determined by dynamic light scattering: a value (CV30) of a coefficient of variation (CV) that is obtained by dividing a standard deviation of particle sizes determined based on a scattering intensity distribution at a detection angle of 30° (forward scattering) by dynamic light scattering, by an average particle size determined based on a scattering intensity distribution at a detection angle of 30° by dynamic light scattering, and multiplying the division result by 100; and a value (CV90) of a coefficient of variation that is obtained by dividing a standard deviation of particle sizes determined based on a scattering intensity distribution at a detection angle of 90° (backward scattering) by dynamic light scattering, by an average particle size determined based on a scattering intensity distribution at a detection angle of 30° by dynamic light scattering, and multiplying the division result by 100. Specifically, the ΔCV value can be determined by a method mentioned in the description of Examples.

There is correlation between the ΔCV value of the abrasive and the number of scratches, and there is correlation between the ΔCV value of the abrasive and the content of nonspherical silica particles. The mechanism by which the certain setting of the ΔCV value leads to the reduction of scratches is not clarified, but it is presumed that aggregates (nonspherical particles) of 50 nm to 200 nm produced by aggregation of primary particles of the abrasive are a causative substance for scratches, and a smaller amount of such aggregates leads to the reduction of scratches.

[Scattering Intensity Distribution]

There are three particle size distributions (scattering intensity; volume conversion; and number conversion) of submicron-level or smaller particles obtained by the dynamic light scattering (DLS) method or a quasielastic light scattering (QLS) method. Among the three particle size distributions, the "scattering intensity distribution" in the present specification is the particle size distribution of scattering intensity. The submicron-level or smaller particles in a solvent generally continue the Brownian motion. Therefore, when these submicron particles are irradiated with a laser beam, the scattered light intensity changes (fluctuates) with time. An autocorrelation function of the fluctuations in the scattered light intensity is determined, e.g., by a photon correlation method (JIS Z 8826). Then, a diffusion coefficient (D) that indicates the velocity of the Brownian motion is calculated by the cumulant analysis. Further, an average particle size (d: hydrodynamic diameter) can be determined using the Einstein-Stokes equation. In addition to the polydispersity index (PI) of the cumulant method, the particle size distribution analysis may be, e.g., a histogram method (Marquardt method), an inverse Laplace transform method (CONTIN method), or a nonnegative least-squares method (NNLS method).

In the particle size distribution analysis by the dynamic light scatting method, the polydispersity index (PI) of the cumulant method is widely used in general. However, in the method for detecting a few nonspherical particles in the particle dispersion, it is preferable that an average particle size (d50) and a standard deviation are determined from the particle size distribution analysis by the histogram method (Marquardt method) or the inverse Laplace transform method (CONTIN method), a CV (coefficient of variation) value (value obtained by dividing the standard deviation by the average particle size and multiplying the result by 100) is calculated, and then the angular dependence (ΔCV value) is obtained.

[Angular Dependence of Scattering Intensity Distribution]

The "angular dependence of the scattering intensity distribution of a particle dispersion" in the present specification indicates the magnitude of a variation in the scattering intensity distribution with the scattering angle when the scattering intensity distribution of the particle dispersion is measured at different detection angles by the dynamic light scattering method. For example, if there is a large difference in the scattering intensity distribution between detection angles of 30° and 90°, the angular dependence of the scattering intensity distribution of the particle dispersion is considered to be large. Therefore, in the present specification, the measurement of the angular dependence of the scattering intensity distribution includes determining a difference (ΔCV value) between the measured values based on the scattering intensity distributions at two different detection angles.

A method for adjusting the particle size distribution of the abrasive is not particularly limited. For example, a desired particle size distribution can be provided by adding particles that serve as new nuclei for the growth of the particles during production of the abrasive, or by mixing two or more types of abrasives having different particle size distributions.

From the viewpoint of improving the polishing rate, the content of the abrasive in the polishing liquid composition of the present invention is preferably 0.5 wt % or more, more preferably 1 wt % or more, still more preferably 3 wt % or more, and further more preferably 4 wt % or more. From the viewpoint of providing a polished substrate surface on which scratches are reduced, the content of the abrasive is preferably 20 wt % or less, more preferably 15 wt % or less, still more preferably 13 wt % or less, and further more preferably 10 wt % or less. That is, the content of the abrasive particles is preferably 0.5 to 20 wt %, more preferably 1 to 15 wt %, still more preferably 3 to 13 wt %, and further more preferably 4 to 10 wt %.

[Water]

The water included in the polishing composition of the present invention is used as a medium, and may be distilled water, ion-exchanged water, or ultrapure water. From the viewpoint of the surface cleaning of a substrate to be polished, the ion-exchanged water and the ultrapure water are preferred, and the ultrapure water is more preferred. The content of water in the polishing composition is preferably 60 to 99.4 wt %, and more preferably 70 to 98.9 wt %. Moreover, an organic solvent such as alcohol may be blended appropriately, to the extent that it does not inhibit the effect of the present invention.

[Acid]

From the viewpoint of improving the polishing rate, the polishing liquid composition of the present invention preferably includes an acid. The use of an acid in the present invention includes the use of an acid and/or a salt of the same. Examples of the acid used in the polishing liquid composition of the present invention include the following: inorganic acids such as nitric acid, sulfuric acid, sulfurous acid, persulfuric acid, hydrochloric acid, perchloric acid, phosphoric acid, phosphonic acid, phosphinic acid, pyrophosphoric acid, tripolyphosphoric acid, and amidosulfonic acid; organic phosphonic acids such as 2-aminoethylphosphonic acid, 1-hydroxyethylidene-1,1-diphosphonic acid, aminotri (methylenephosphonic acid), ethylenediaminetetra (methylenephosphonic acid), diethylenetriaminepenta (methylenephosphonic acid), ethane-1,1-diphosphonic acid, ethane-1,1,2-triphosphonic acid, ethane-1-hydroxy-1,1-diphosphonic acid, ethane-1-hydroxy-1,1,2-triphosphonic acid, ethane-1,2-dicarboxy-1,2-diphosphonic acid, methanehydroxyphosphonic acid, 2-phosphonobutane-1,2-dicarboxylic acid, 1-phosphonobutane-2,3,4-tricarboxylic acid, and α-methylphosphonosuccinic acid; aminocarboxylic acids such as glutamic acid, picolinic acid, and aspartic acid; and carboxylic acids such as citric acid, tartaric acid, oxalic acid, nitroacetic acid, maleic acid, and oxaloacetic acid. Above all, inorganic acids, and organic phosphonic acids are preferred from the viewpoint of reducing scratches and waviness of the substrate surface, and the viewpoint of improving the stability of an oxidizing agent, and improving the disposability of waste liquid. Among the inorganic acids, nitric acid, sulfuric acid, hydrochloric acid, perchloric acid, and phosphoric acid are preferred, and phosphoric acid and sulfuric acid are more preferred. Among the organic phosphonic acids, 1-hydroxyethylidene-1,1-diphosphonic acid, aminotri (methylenephosphonic acid), ethylenediaminetetra(methylenephosphonic acid), diethylenetriaminepenta(methylenephosphonic acid), and salts of the same are preferred, and 1-hydroxyethylidene-1,1-diphosphonic acid, and aminotri (methylenephosphonic acid) are more preferred.

These acids may be used individually or in combinations of two or more. From the viewpoint of improving the polishing rate and improving the surface cleaning of the substrate, a mixture of two or more of the acids is preferred, and from the viewpoint of reducing scratches, improving the stability of an oxidizing agent, and improving the disposability of waste liquid, a mixture of two or more acids selected from the group consisting of phosphoric acid, sulfuric acid, and 1-hydroxyethylidene-1,1-diphosphonic acid is more preferred.

When the salts of the above acids are used, such salts are not particularly limited, and specifically may be their salts with metals, ammonium, alkylammonium, etc. Specific examples of the metals include the metals belonging to Groups IA, 1B, 2A, 2B, 3A, 3B, 4A, 6A, 7A and 8 of the periodic table (long-period form). Among them, the salts of the acids with the metals of Group 1A or ammonium are preferred, from the viewpoint of providing a polished substrate surface on which scratches are reduced.

From the viewpoint of improving the polishing rate and providing a polished substrate surface on which scratches are reduced, the content of the acid and its salt in the polishing liquid composition is preferably 0.001 to 5.0 wt %, more preferably 0.01 to 4.0 wt %, still more preferably 0.05 to 3.0 wt %, further more preferably 0.1 to 2.0 wt %, and still further more preferably 0.4 to 1.0 wt %.

[Oxidizing Agent]

The polishing liquid composition of the present invention preferably contains an oxidizing agent, from the viewpoint of improving the polishing rate and reducing scratches and waviness of the substrate surface. The oxidizing agent that can be used for the polishing liquid composition of the present invention may be, for example, peroxide, permanganic acid or its salt, chromic acid or its salt, peroxoacid or its salt, oxyacid or its salt, a metal salt, a nitric acid, a sulfuric acid, or the like.

The peroxide may be, for example, hydrogen peroxide, sodium peroxide, or barium peroxide. The permanganic acid or its salt may be, for example, potassium permanganate. The chromic acid or its salt may be, for example, a metal salt of chromic acid or a metal salt of bichromic acid. The peroxoacid or its salt may be, for example, peroxodisulfuric acid, ammonium peroxodisulfate, a metal salt of peroxodisulfuric acid, peroxophosphoric acid, peroxosulfuric acid, sodium peroxoborate, performic acid, peracetic acid, perbenzoic acid, or perphthalic acid. The oxyacid or its salt may be, for example, hypochlorous acid, hypobromous acid, hypoiodous acid, chloric acid, bromic acid, iodic acid, sodium hypochlorite, or calcium hypochlorite. The metal salt may be, for example, iron (III) chloride, iron (III) nitrate, iron (III) sulfate, iron (III) citrate, and ammonium iron (III) sulfate.

Examples of a suitable oxidizing agent from the viewpoint of providing a polished substrate surface on which scratches and waviness are reduced include hydrogen peroxide, iron (III) nitrate, peracetic acid, ammonium peroxodisulfate, iron (III) sulfate, and ammonium iron (III) sulfate. A more suitable oxidizing agent is hydrogen peroxide, since it is widely available and inexpensive, and adhesion of a metal ion to the surface does not occur. These oxidizing agents may be used individually or in combinations of two or more.

From the viewpoint of improving the polishing rate, the content of the oxidizing agent in the polishing liquid composition is preferably 0.01 wt % or more, more preferably 0.05 wt % or more, and even more preferably 0.1 wt % or more. From the viewpoint of providing a polished substrate surface on which scratches and waviness are reduced, the content of the oxidizing agent is preferably 4 wt % or less, more preferably 2 wt % or less, and even more preferably 1 wt % or less. Therefore, to improve the polishing rate while maintaining the surface quality, the content of the oxidizing agent is preferably 0.01 to 4 wt %, more preferably 0.05 to 2 wt %, and even more preferably 0.1 to 1 wt %.

[Other Components]

The polishing liquid composition of the present invention may include other components as required. Examples of the other component include a thickening agent, a dispersant, an anticorrosive agent, basic substances, and a surfactant. The content of such other optional components in the polishing liquid composition is preferably 0 to 10 wt %, and more preferably 0 to 5 wt %. It should be noted that the polishing liquid composition of the present invention can exhibit the effect of reducing scratches and waviness of the substrate surface, even if it does not contain such other component, particularly a surfactant. Besides, the polishing liquid composition of the present invention may contain alumina abrasive grain, and may be used in a lapping step previous to the final polishing step.

[pH of Polishing Composition]

From the viewpoint of improving the polishing rate, the pH of the polishing liquid composition of the present invention is preferably 4.0 or less, more preferably 3.5 or less, even more preferably 3.0 or less, and further more preferably 2.5 or less. From the viewpoint of reducing the surface roughness, the pH of the polishing liquid composition is preferably 0.5 or more, more preferably 0.8 or more, even more preferably 1.0 or more, and further more preferably 1.2 or more. Therefore, the pH of the polishing liquid composition is preferably 0.5 to 4.0, more preferably 0.8 to 3.5, still more preferably 1.0 to 3.0, and further more preferably 1.2 to 2.5.

[Method for Preparing Polishing Liquid Composition]

The polishing liquid composition of the present invention can be prepared, for example, by mixing water, the abrasive, the water-soluble polymer, as well as optionally the acid and/or its salt, the oxidizing agent, and the other components by a known method. Here, the abrasive may be mixed either in the form of condensed slurry, or may be mixed after being diluted with water or the like. The content and concentration of each component in the polishing liquid composition of the present invention fall in the ranges described above. However, in another aspect, the polishing liquid composition of the present invention may be prepared in the form of a concentrated composition.

The polishing liquid composition of the present invention can be used suitably for manufacturing a substrate for a precision component. For example, the polishing liquid composition of the present invention is suitable for the polishing of magnetic disk substrates of magnetic disks, magneto-optical disks, optical disks, etc., photomask substrates, and substrates for precision components such as optical lenses, optical mirrors, optical prisms, and semiconductor substrates. Above all, the polishing liquid composition of the present invention is particularly suitable for the polishing of magnetic disk substrates. In the manufacture of semiconductor substrates, the polishing liquid composition of the present invention can be used in the step of polishing a silicon wafer (bare wafer), the step of forming an embedded element separation film, the step of flattening an interlayer insulation film, the step of forming embedded metal lines, the step of forming an embedded capacitor, etc.

Examples of a material of an object to be polished to which the polishing liquid composition of the present invention is suitably used include metals or metalloids such as silicon, aluminum, nickel, tungsten, copper, tantalum, and titanium, and alloys of these metals; glassy substances such as glass, glassy carbon, and amorphous carbon; ceramic materials such as alumina, silicon dioxide, silicon nitride, tantalum nitride, and titanium carbide; and resins such as a polyimide resin. The polishing liquid composition of the present invention is suitable for an object to be polished that contains, among those described above, a metal such as aluminum, nickel, tungsten, or copper, or an alloy that contains such a metal as the main component. For example, the polishing liquid composition of the present invention is more suitable for a Ni—P plated aluminum alloy substrate and a glass substrate such as crystallized glass or tempered glass, and is further more suitable for the Ni—P plated aluminum alloy substrate.

[Method for Manufacturing a Substrate]

The present invention in another aspect relates to a method for manufacturing a substrate (hereinafter also referred to as "the manufacturing method of the present invention"). The manufacturing method of the present invention is a method for manufacturing a substrate, the method including the step of polishing a substrate to be polished, while bringing the above-described polishing liquid composition into contact with a polishing pad (this step is also referred to as a "polishing step using the polishing liquid composition of the present invention"). This method can provide a substrate having a polished surface on which scratches are reduced, and further, waviness is reduced. The manufacturing method of the present invention is suitable for the manufacture of a magnetic disk substrate, and particularly suitable for the manufacture of a magnetic disk substrate for a perpendicular magnetic recording system. Thus, in another aspect, the manufacturing method of the present invention is a substrate manufacturing method, preferably is a method for manufacturing a magnetic disk substrate, and more preferably is a method for manufacturing a magnetic disk substrate for the perpendicular magnetic recording system, which includes a polishing step using the polishing liquid composition of the present invention.

A specific example of the method for polishing a substrate to be polished using the polishing liquid composition of the present invention may be a method of sandwiching the substrate to be polished between surface plates to which a polishing pad such as a nonwoven organic polymer polishing cloth is attached, and polishing the substrate to be polished by moving the surface plates and the substrate, while supplying the polishing liquid composition of the present invention to a polishing machine.

When the polishing of a substrate to be polished is carried out at multiple stages, the polishing step using the polishing liquid composition of the present invention is carried out preferably at any of the second and subsequent stages, and more preferably at the final polishing process. Here, to avoid an abrasive material or a polishing liquid composition of the previous stage entering, different polishing machines may be used at the stages, respectively. When the different polishing machines are used, it is preferable that the substrate to be polished is cleaned after each polishing step. The polishing liquid composition of the present invention also can be used in circular polishing that recycles the used polishing liquid. It should be noted that the polishing machine is not particularly limited, and a known polishing machine for polishing a substrate can be used.

[Polishing Pad]

The polishing pad used in the present invention is not particularly limited, and may be a suede type, a nonwoven fabric type, a polyurethane closed-cell foam type, or a two-layer type in which these materials are laminated. From the viewpoint of the polishing rate, the suede type polishing pad is preferred.

From the viewpoint of reducing scratches and ensuring the pad lifetime, the average pore diameter of the surface member of the polishing pad is preferably 50 μm or less, more preferably 45 μm or less, even more preferably 40 μm or less, and further more preferably 35 μm or less. From the viewpoint of the polishing liquid retention capacity of the pad, the average pore diameter is preferably 0.01 μm or more, more preferably 01 μm or more, even more preferably 1 μm or more, and further more preferably 10 μm or more so as to retain the polishing liquid in the pores and prevent a lack of the polishing liquid. From the viewpoint of maintaining the polishing rate, the maximum value of the pore diameter of the polishing pad is preferably 100 μm or less, more preferably 70 μm or less, even more preferably 60 μm or less, and particularly preferably 50 μm or less.

[Polishing Pressure]

In the polishing step using the polishing liquid composition of the present invention, the polishing pressure is preferably 5.9 kPa or more, more preferably 6.9 kPa or more, and even more preferably 7.5 kPa or more. This can suppress a reduction in the polishing rate, and thus can improve the productivity. The polishing pressure in the manufacturing method of the present invention refers to the pressure of a surface plate applied to the polishing surface of the substrate to be polished during polishing. In the polishing step using the polishing liquid composition of the present invention, the polishing pressure is preferably 20 kPa or less, more preferably 18 kPa or less, and even more preferably 16 kPa or less. This can suppress the occurrence of scratches. Accordingly, the polishing pressure in the polishing step using the polishing liquid composition of the present invention is preferably 5.9 to 20 kPa, more preferably 6.9 to 18 kPa, and even more preferably 7.5 to 16 kPa. The polishing pressure can be adjusted by applying an air pressure or a weight on at least one of the surface plates and the substrate to be polished.

[Supply of Polishing Liquid Composition]

From the viewpoint of reducing scratches, the rate of supply of the polishing liquid composition of the present invention in the polishing step using the polishing liquid composition of the present invention is preferably 0.05 to 15 mL/min, more preferably 0.06 to 10 mL/min, even more preferably 0.07 to 1 mL/min, and further more preferably 0.07 to 0.5 mL/min per 1 $cm^2$ of the substrate to be polished.

The polishing liquid composition of the present invention may be, for example, continuously supplied to a polishing machine by using a pump or the like. Moreover, the polishing liquid composition may be supplied to a polishing machine as a single solution containing all the components. Alternatively, in view of the stability or the like of the polishing liquid composition, it may be divided into a plurality of component solutions, and two or more component solutions may be supplied. In the latter case, the plurality of component solutions are mixed, for example, in a supply pipe or on the substrate to be polished, thereby forming the polishing liquid composition of the present invention.

[Substrate to be Polished]

Examples of the material for the substrate to be polished that is suitably used in the present invention include metals or metalloids such as silicon, aluminum, nickel, tungsten, copper, tantalum, and titanium, and alloys of these metals; glassy substances such as glass, glassy carbon, and amorphous carbon; ceramic materials such as alumina, silicon dioxide, silicon nitride, tantalum nitride, and titanium carbide; and resins such as a polyimide resin. Among them, the substrate to be polished containing a metal such as aluminum, nickel, tungsten, copper, or an alloy that contains such a metal as the main component, or the glass substrate is preferred. In particular, a Ni—P plated aluminum alloy substrate or an aluminosilicate glass substrate is preferred, and the Ni—P plated aluminum alloy substrate is preferred further. Exemplary aluminosilicate glass substrates include those having a crystalline structure, and those chemically strengthened. The chemically strengthening treatment may be carried out after polishing.

The present invention can provide a substrate having a polished surface on which scratches are reduced, and moreover, waviness is reduced as well. Therefore, the present invention can be suitably applicable to the polishing of a magnetic disk substrate that is required to have enhanced surface smoothness, particularly, to the polishing of a magnetic disk substrate for the perpendicular magnetic recording system.

The shape of the substrate to be polished is not particularly limited, and a shape having a flat portion, such as a disk form, a plate form, a slab form, or a prism form, and a shape with a curved portion such as a lens may be used. In particular, a disk shaped substrate is suitable. When the substrate to be polished has a disk shape, the outer diameter is, for example, about 2 to 95 mm and the thickness is, for example, about 0.5 to 2 mm.

[Polishing Method]

The present invention in another aspect relates to a method for polishing a substrate to be polished, the method including polishing the substrate to be polished while bringing the above-described polishing liquid composition into contact with the polishing pad. By using the polishing method of the present invention, a substrate is provided that has a polished surface on which scratches are reduced, and moreover, waviness is reduced. As the substrate to be polished to which the polishing method of the present invention is applied, any substrate used in manufacture of magnetic disk substrates may be used as described above. Among them, a substrate used in manufacture of a magnetic disk substrate of a perpendicular magnetic recording system is preferred. It should be noted that specific polishing method and conditions may be set as described above.

EXAMPLE

Examples 1 to 18 and Comparative Examples 1 to 7

Polishing liquid compositions of Examples 1 to 18 and Comparative Examples 1 to 7 were prepared, and substrates to be polished were polished with the polishing liquid compositions, and washed with pure water, whereby substrates for evaluation were obtained. The foaming properties of the polishing liquid upon polishing, the polishing rate, and the scratches and waviness on a surface of the substrates for evaluation were evaluated. The water-soluble polymers used, the methods of preparing the polishing liquid compositions, the methods of determining the parameters, the polishing conditions (polishing methods), and the evaluation methods are as shown below.

1. Preparation Method of Polishing Liquid Composition

An abrasive (colloidal silica), each of water-soluble polymers or comparative compounds shown below, sulfuric acid, HEDP (1-hydroxyethylidene-1,1-diphosphonic acid, manufactured by Solutia Japan Limited), and a hydrogen peroxide solution (with a concentration of 35 wt %) were added to ion-exchanged water and stirred, whereby the polishing liquid compositions of Examples 1 to 18 and Comparative Examples 1 to 7 (pH 1.5) were prepared. The contents of the abrasive, the sulfuric acid, the HEDP, and the hydrogen peroxide in the polishing liquid compositions were 5 wt %, 0.5 wt %, 0.1 wt %, and 0.5 wt %, respectively. The average particle sizes and the ΔCV values of the abrasives, and the amounts of the water-soluble polymers and the comparative compounds added in the polishing liquid compositions are shown in Table 2 below.

[Water-Soluble Polymer]

As the water-soluble polymer, the water-soluble copolymers shown in Table 1 below having a constituent unit A and a constituent unit B (manufactured by Konishi Chemical Ind. Co., Ltd.) were used. The polymerization molar ratios and the weight-average molecular weights of the water-soluble copolymers are as shown in Table 1. The weight-average molecular weight was determined by gel permeation chromatography (GPC) under the conditions shown below. It should be noted that the contents of residual formaldehyde in the water-soluble copolymers, the surface tensions and the solubilities of the water-soluble copolymers were determined under the conditions show below. The results are shown in Table 1.

[Method of Determining Weight-Average Molecular Weight of Water-Soluble Copolymer>

Column: TSKgel GMPWXL+TSKgel GMPWXL (manufactured by TOSOH CORPORATION)
Eluent: 0.2 M phosphate buffer/$CH_3CN$=7/3 (volume ratio)
Temperature: 40° C.
Flow rate: 1.0 mL/min
Sample size: 2 mg/ml
Detector: RI
Reference substance: sodium polystyrene sulfonate (with weight-average molecular weights of 1100, 3610, 14900, and 152000, manufactured by PSS Polymer Standards Service GmbH)

[Residual Formaldehyde in Water-Soluble Copolymer, and Method for Determining the Content of Formaldehyde in the Polishing Liquid Composition]

The content of residual formaldehyde contained in each water-soluble copolymer, and the content of formaldehyde in each polishing liquid composition were determined by post-column HPLC (high performance liquid chromatography) using acetylacetone derivatization under the conditions shown below. Results regarding residual formaldehyde in each water-soluble copolymer are shown in Table 1 below.

Column: Hitachi-Inertsil ODS-3 (5 μm)
Eluent A: 60 mmol/L $Na_2HPO_4$ (pH2.1/$H_3PO_4$),
 B: 80% aqueous solution of acetonitrile
Inclination conditions: B: 0% (0 to 10 min), 100% (10.1 to 20 min), 0% (20.1 to 30 min)
Reaction solution: C: acetylacetone solution
Flow rate: A, B: 1.0 ml/min, C, 0.5 ml/min
Column temperature: 25° C.
Sample size: 50 μl
Reaction temperature: 90° C.
Detector: wavelength 414 nm, visible light

[Method for Determining Surface Tension]

Each water-soluble copolymer was dissolved in pure water so as to be 500 ppm, and a surface tension of the water-soluble copolymer was determined by the Wilhelmy method using a platinum plate having a width of 19 mm, a bight of 10 mm, and a thickness of 0.2 mm, using an automatic surface tensiometer "CBVP-Z" (manufactured by Kyowa Interface Science Co., Ltd.)

[Method for Determining Solubility]

A certain set amount of each watersoluble copolymer was added to 100 g of water under stirring, and the solubility thereof was checked. In the case where the watersoluble copolymer was dissolved completely, further a certain set amount of the watersoluble copolymer was added under stirring. This operation was repeated. When incomplete dissolution was observed after one hour stirring at 20° C. finally, a total amount of the added water-soluble copolymer immediately before the incomplete dissolution was regarded as a solubility.

(tradename: FLOWRIC SF200S, manufactured by FLOWRIC Co., Ltd.)

sodium salt of acrylic acid/acrylamide-2-methylpropane sulfonic acid copolymer (AA-AMPS)
(surface tension: 63.0 mN/m) (molar ratio: 90/10, weight-average molecular weight: 2000, manufactured by TOAGOSEI Co., Ltd.)

sodium salt of polystylene/polystylene sulfonic acid copolymer (St-SS)
(surface tension: 57.3 mN/m) (molar ratio: 80/20, weight-average molecular weight: 8000, manufactured by Kao Corporation)

TABLE 1

| | Constituent unit A | Constituent unit B | Ratio (charged) Constituent unit A (mol %) | Ratio (charged) Constituent unit B (mol %) | Weight-average molecular weight (Mw) | Surface tension (mN/m) | Solubility (g/100 g Water) | Content of residual formaldehyde (ppm) |
|---|---|---|---|---|---|---|---|---|
| Water-soluble copolymer-1 | [structure with OH, CH₂, O=S=O, phenyl-OH] | [structure with OH, CH₂, SO₃Na] | 20 | 80 | 23000 | 70.9 | 81.8 | 5200 |
| Water-soluble copolymer-2 | | | 30 | 70 | 23100 | 70.8 | 76.4 | 5090 |
| Water-soluble copolymer-3 | | | 40 | 60 | 24000 | 70.6 | 73.1 | 5100 |
| Water-soluble copolymer-4 | | | 20 | 80 | 39500 | 70.8 | 75.1 | 5150 |
| Water-soluble copolymer-5 | | | 20 | 80 | 11000 | 70.7 | 82.3 | 5200 |
| Water-soluble copolymer-6 | | | 20 | 80 | 18000 | 70.5 | 81.7 | 3900 |
| Water-soluble copolymer-7 | | | 20 | 80 | 18900 | 70.4 | 81.4 | 600 |
| Water-soluble copolymer-8 | | | 20 | 80 | 17500 | 70.4 | 81.2 | 170 |
| Water-soluble copolymer-9 | | | 20 | 80 | 9700 | 70.3 | 81.9 | 260 |
| Water-soluble copolymer-10 | | | 20 | 80 | 5000 | 70.5 | 82.1 | 370 |
| Water-soluble copolymer-11 | [structure with OH, CH₂, CH₂, phenyl-OH] | [structure with OH, CH₂, SO₃Na] | 30 | 70 | 22000 | 69.8 | 54.7 | 5240 |

[Comparative Compound]

The following chemical compounds were used as comparative objects of the above-described water-soluble polymers.

sodium naphthalene sulfonate formaldehyde condensate
(surface tension: 66.3 mN/m)
(tradename: VANIOL HDP-100, manufactured by Nippon Paper Chemicals Co., Ltd.)

sodium lignosulfonate (surface tension: 67.3 mN/m)
(tradename: PEARLLEX NP, manufactured by Nippon Paper Chemicals Co., Ltd.)

naphthalene sulfonic acid-based compound (surface tension: 66.3 mN/m)
(tradename: FLOWRIC PSR110, manufactured by FLOWRIC Co., Ltd.)

aromatic aminosulfonic acid-based compound (surface tension: 71.8 mN/m)

[Method for Measuring Average Particle Size and $\Delta CV$ Value of Abrasive]

[Average Particle Size]

The colloidal silica, the sulfuric acid, the HEDP, and the hydrogen peroxide solution used in the preparation of the polishing liquid compositions were added to the ion-exchanged water and stirred, whereby reference samples were prepared (pH 1.5). The contents of the colloidal silica, the sulfuric acid, the HEDP, and the hydrogen peroxide in the reference samples were 5 wt %, 0.5 wt %, 0.1 wt %, and 0.5 wt %, respectively. Regarding of the scattering intensity distribution at a detection angle of 90° determined by the cumulant method through 200 times of integration using a dynamic light scattering device (DLS-6500, manufactured by Otsuka Electronics Co., Ltd.) in accordance with the manufacturer's instruction manual, a particle size of the colloidal silica corresponding to 50% of the total area of the scattering intensity distribution was determined, and the particle size thus determined was regarded as an average particle size of the colloidal silica.

[ΔCV Value]

A ΔCV value was obtained by subtracting the CV value (CV90) of the colloidal silica particles at the detection angle of 90° from a CV value (CV30) of the colloidal silica particles at a detection angle of 30°, using the same samples and the same measurement device as those described above. The average particle size of the colloidal silica
Measurement Conditions of DLS-6500
Detection angle: 90°
Sampling time: 4 (μm)
Correlation channel: 256 (° C.)
Correlation method: TI
Sampling temperature: 26.0 (° C.)
Detection angle: 30°
Sampling time: 10 (μm)
Correlation channel: 1024 (ch)
Correlation method: TI
Sampling temperature: 26.0 (° C.)

[Method for Evaluating Foaming Properties of Polishing Liquid Composition]

Each of the polishing liquid compositions of Examples 1 to 18 and Comparative Examples 1 to 7 prepared in 2 L beakers was poured into a dispobeaker from 5 cm above the top end of the dispobeaker (pouring rate: 600 ml/min), and foaming properties of the polishing liquid composition at 30 seconds after the pouring were evaluated by the following evaluation criteria. Results of the evaluation are shown in Table 2 below.
Evaluation Criteria of Foaming Properties:
A: substantially no bubble was formed, or even if bubbles were formed, they disappeared immediately;
B: bubbles were formed and did not disappear.

2. Polishing Method

Using the polishing liquid compositions of Examples 1 to 18 and Comparative Examples 1 to 7 prepared as described above, substrates to be polished (as described below) were polished under the following polishing conditions. Subsequently, scratches and waviness on polished substrate surfaces, and polishing rates were measured under the following conditions and evaluated.

[Substrate to be Polished]

Used as the substrate to be polished was a Ni—P plated aluminum alloy substrate that was preliminarily polished roughly with a polishing liquid composition containing an alumina abrasive. This substrate had a thickness of 1.27 mm, an outer diameter of 95 mm, an inner diameter of 25 mm, and a center line average roughness Ra of 1 nm, which was measured with an AFM (Digital Instrument NanoScope IIIa Multi Mode AFM). Moreover, the substrate had an amplitude of long-wavelength waviness (wavelength: 0.4 to 2 mm) of 2 nm, and an amplitude of short-wavelength waviness (wavelength: 50 to 400 μm) of 2 nm.

[Polishing Conditions]
Polishing test machine: "9B Double Side Polisher" manufactured by Speedfam Co., Ltd.
Polishing pad: suede type (thickness: 0.9 mm, average pore diameter: 30 μm) manufactured by FUJIBO HOLDINGS, INC.
Supply of polishing composition: 100 mL/min (supply rate per 1 $cm^2$ of a substrate to be polished: 0.072 mL/min)
Number of revolutions of lower surface plate: 32.5 rpm
Polishing pressure: 7.9 kPa
Polishing time: 4 minutes

[Measuring Method of Scratches]

Measuring device: OSA6100 manufactured by Candela Instruments, Inc.

Evaluation: Four substrates were randomly selected from the substrates placed in the polishing test machine, and scratches were measured by irradiating each of the four substrates with a laser at 10000 rpm. Then, the total number of scratches on both surfaces of the four substrates was divided by 8, whereby the number of scratches per substrate surface was calculated. Results of the same are shown in Table 2 below, as relative values with respect to a value of Comparative example 1 that is assumed to be 100.

[Measuring Method of Waviness]

A polishing time was set so that a weight decreased by polishing should be 17 mg or more, and another polishing time was set so that a weight decreased by polishing should be 17 mg or less. Waviness of each polished substrate was measured under the following conditions, a value of waviness per a polished amount was determined. By interpolating these values, a value of waviness when the weight decreased by 17 mg was calculated. For each polishing time thus set, three substrates were subjected to the measurement of waviness, and an average value was calculated as a substrate waviness value. Results of the same are shown in Table 2, as relative values with respect to a value of Comparative Example 1 that is assumed to be 100.

Measuring machine: New View 5032 (manufactured by Zygo Corporation)
Lens: 2.5 times magnification
Zoom: 0.5 time magnification
Measurement wavelength: 159 to 500 μm
Measurement position: 27 mm in radial direction from the substrate center
Analysis software: Zygo Metro Pro (manufactured by Zygo Corporation)

[Method for Measuring Polishing Rate]

The weights of each substrate before and after polishing were measured with a gravimeter ("BP-210S" manufactured by Sartorius Ltd.), and a change in weight of each substrate was determined. Then, the average of the weight changes of 10 substrates was obtained as a weight decrement, and the weight decrement was divided by the polishing time, whereby a weight decreasing rate was determined. This weight decreasing rate was substituted in the following equation and thus converted to a polishing rate (μm/min). Results of the same are shown in Table 2 below.

$$\text{Polishing rate (μm/min)} = \text{weight decreasing rate (g/min)/area of one side of a substrate }(mm^2)/\text{Ni—P plating density }(g/cm^3) \times 10^6$$

(where the area of one side of the substrate was 6597 $mm^2$ and the Ni—P plating density was 7.99 $g/cm^3$)

TABLE 2

| | | Average particle size of abrasive (nm) | ΔCV value of abrasive (%) | Water-soluble copolymer | Content (wt %) | Molecular weight | Amount of residual formaldehyde (ppm) | Foaming properties of polishing liquid | Polishing rate (μm/min) | Scratch (relative value) | Waviness (relative value) |
|---|---|---|---|---|---|---|---|---|---|---|---|
| Ex. | 1 | 24 | 3.2 | Water-soluble copolymer-1 (A/B = 20/80) | 0.01 | 23000 | 0.52 | A | 0.10 | 20 | 90 |
| | 2 | 24 | 3.2 | Water-soluble copolymer-1 (A/B = 20/80) | 0.03 | 23000 | 1.56 | A | 0.09 | 16 | 88 |
| | 3 | 24 | 3.2 | Water-soluble copolymer-1 (A/B = 20/80) | 0.05 | 23000 | 2.60 | A | 0.08 | 15 | 88 |
| | 4 | 24 | 3.2 | Water-soluble copolymer-2 (A/B = 30/70) | 0.01 | 23100 | 0.51 | A | 0.11 | 19 | 89 |
| | 5 | 24 | 3.2 | Water-soluble copolymer-2 (A/B = 30/70) | 0.03 | 23100 | 1.53 | A | 0.09 | 15 | 91 |
| | 6 | 24 | 3.2 | Water-soluble copolymer-2 (A/B = 30/70) | 0.05 | 23100 | 2.55 | A | 0.09 | 15 | 88 |
| | 7 | 24 | 3.2 | Water-soluble copolymer-3 (A/B = 40/60) | 0.01 | 24000 | 0.51 | A | 0.10 | 22 | 89 |
| | 8 | 24 | 3.2 | Water-soluble copolymer-3 (A/B = 40/60) | 0.03 | 24000 | 1.53 | A | 0.08 | 16 | 87 |
| | 9 | 24 | 3.2 | Water-soluble copolymer-3 (A/B = 40/60) | 0.05 | 24000 | 2.55 | A | 0.07 | 15 | 89 |
| | 10 | 24 | 3.2 | Water-soluble copolymer-4 (A/B = 20/80) | 0.05 | 39500 | 2.58 | A | 0.07 | 17 | 90 |
| | 11 | 24 | 3.2 | Water-soluble copolymer-5 (A/B = 20/80) | 0.05 | 11000 | 2.60 | A | 0.09 | 18 | 89 |
| | 12 | 24 | 3.2 | Water-soluble copolymer-6 (A/B = 20/80) | 0.01 | 18000 | 0.39 | A | 0.08 | 16 | 90 |
| | 13 | 24 | 3.2 | Water-soluble copolymer-7 (A/B = 20/80) | 0.01 | 18900 | 0.06 | A | 0.08 | 14 | 89 |
| | 14 | 24 | 3.2 | Water-soluble copolymer-8) (A/B = 20/80 | 0.01 | 17500 | 0.02 | A | 0.08 | 12 | 89 |
| | 15 | 24 | 3.2 | Water-soluble copolymer-9 (A/B = 20/80) | 0.01 | 9700 | 0.03 | A | 0.09 | 17 | 90 |
| | 16 | 24 | 3.2 | Water-soluble copolymer-10 (A/B = 20/80) | 0.01 | 5000 | 0.04 | A | 0.08 | 19 | 90 |
| | 17 | 24 | 3.2 | Water-soluble copolymer-11 (A/B = 30/70) | 0.05 | 22000 | 2.62 | A | 0.08 | 25 | 89 |
| | 18 | 26 | 9.8 | Water-soluble copolymer-1 (A/B = 20/80) | 0.05 | 23000 | 2.60 | A | 0.09 | 25 | 90 |
| Comp. Ex. | 1 | 24 | 3.2 | — | — | | 0.00 | A | 0.11 | 100 | 100 |
| | 2 | 24 | 3.2 | Sodium naphthalene sulfonate formaldehyde condensate | 0.03 | | 0.09 | A | 0.09 | 60 | 98 |
| | 3 | 24 | 3.2 | Sodium lignosulfonate | 0.03 | | 0.12 | A | 0.08 | 45 | 98 |
| | 4 | 24 | 3.2 | Naphthalene sulfonic acid-based compound | 0.03 | | 0.08 | A | 0.08 | 50 | 97 |
| | 5 | 24 | 3.2 | Aromatic aminosulfonic acid-based compound | 0.03 | | 0.09 | A | 0.09 | 45 | 96 |
| | 6 | 24 | 3.2 | AA-AMPS | 0.03 | | 0.00 | B | 0.10 | 30 | 97 |
| | 7 | 24 | 3.2 | St-SS | 0.03 | | 0.00 | B | 0.06 | 25 | 89 |

As shown in Table 2, it was proved that, as compared with the polishing liquid composition of Comparative Examples 1 to 7, the polishing liquid compositions of Examples 1 to 18 efficiently reduced scratches and waviness on the substrate surfaces, while foaming less and allowing the polishing rate to be kept high.

The present invention makes it possible to, for example, provide a magnetic disk substrate suitable for higher recording density.

The present invention can relate to any one of the following:

<1> A polishing liquid composition comprising an abrasive, a water-soluble polymer, and water, wherein the water-soluble polymer has a sulfonic acid group, and has an aromatic ring in each of a main chain and a side chain;

<2> The polishing liquid composition according to <1>, wherein the water-soluble polymer is a water-soluble copolymer that includes:

a constituent unit that is a repeat unit having an aromatic ring in each of a main chain and a side chain thereof and a constituent unit that has a sulfonic acid group;

<3> The polishing liquid composition according to <1> or <2>, wherein the water-soluble polymer is a water-soluble polymer synthesized by addition condensation with formaldehyde;

<4> The polishing liquid composition according to any one of <1> to <3>, wherein the water-soluble polymer includes a constituent unit A that is a repeat unit having an aromatic ring in each of a main chain and a side chain thereof the constituent unit A being expressed by a general formula (I) shown below:

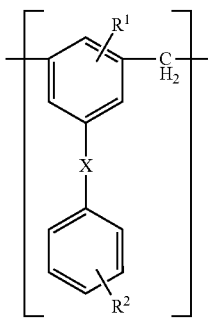

(I)

where

X represents a bond, —CH$_2$—, —S—, —SO$_2$—, —C(CH$_3$)$_2$—, or

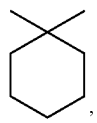

,

R$^1$ and R$^2$ are identical or different to/from each other and each represents a hydrogen atom, an alkyl group, an alkoxy group, an aralkyl group, or —OM, and M is selected from the group consisting of alkali metals, alkali earth metals, organic cations, and a hydrogen atom;

<5> The polishing liquid composition according to <4>, wherein in the formula (I), X represents —SO$_2$— or —CH$_2$—;

<6> The polishing liquid composition according to <4> or <5>, wherein in the formula (I), R$^1$ and R$^2$ represent —OM each, and M represents sodium, potassium, ammonium, or a hydrogen atom;

<7> The polishing liquid composition according to any one of <4> to <6>, wherein a content of the constituent unit A in entire constituent units composing the water-soluble copolymer is 5 to 70 mol %, preferably 5 to 60 mol %, more preferably 5 to 50 mol %, still more preferably 10 to 45 mol %, further more preferably 10 to 40 mol %, and still further more preferably 20 to 40 mol %;

<8> The polishing liquid composition according to any one of <1> to <7>, wherein the water-soluble polymer includes a constituent unit B having a sulfonic acid group, the constituent unit B being expressed by a general formula (II) shown below:

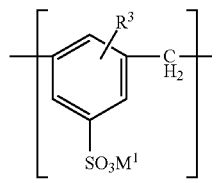

(II)

where

R$^3$ represents a hydrogen atom, an alkyl group, an alkoxy group, an aralkyl group, or —OM$^2$, and M$^1$ and M$^2$ are identical or different to/from each other, and are selected from the group consisting of alkali metals, alkali earth metals, organic cations, and a hydrogen atom;

<9> The polishing liquid composition according to <8>, wherein, in the formula cm, R$^3$ represents —OM$^1$, and M$^1$ represents sodium, potassium, ammonium, or a hydrogen atom;

<10> The polishing liquid composition according to <8> or <9>, wherein a content of the constituent unit B in entire constituent units composing the water-soluble copolymer is 30 to 95 mol %, preferably 40 to 95 mol %, more preferably 50 to 95 mol %, still more preferably 55 to 90 mol %, further more preferably 60 to 90 mol %, and still further more preferably 60 to 80 mol %;

<11> The polishing liquid composition according to any one of <8> to <10>, wherein a molar ratio between the constituent unit A and the constituent unit B in entire constituent units composing the water-soluble copolymer (constituent unit A/constituent unit B) is 70/30 to 5/95, preferably 60/40 to 5/95, more preferably 50/50 to 5/95, still more preferably 45/55 to 10/90, further more preferably 40/60 to 10/90, still further more preferably 35/65 to 15/85, still further more preferably 35/65 to 20/80, and still further more preferably 35/65 to 25/75;

<12> The polishing liquid composition according to any one of <1> to <11>, wherein the water-soluble polymer has a surface tension of 45 to 100 mN/m, preferably 50 to 90 mN/m, more preferably 55 to 80 mN/m, further more preferably 65 to 75 mN/m, and still further more preferably 68 to 72 mN/m;

<13> The polishing liquid composition according to any one of <1> to <12>, wherein the water-soluble polymer has a weight-average molecular weight of 500 to 120000, preferably 1000 to 100000, more preferably 1000 to 50000, still more preferably 1500 to 40000, further more preferably 3000 to 40000, still further more preferably 4500 to 40000, still further more preferably 5000 to 40000, still further more preferably 8000 to 30000, still further more preferably 10000 to 25000, and still further more preferably 10000 to 20000;

<14> The polishing liquid composition according to any one of <1> to <13>, wherein a content of the water-soluble polymer in the polishing liquid composition is 0.001 to 1 wt %, preferably 0.003 to 0.5 wt %, more preferably 0.005 to 0.2 wt %, still more preferably 0.007 to 0.15 wt %, further more preferably 0.01 to 0.1 wt %, still furthermore preferably 0.01 to 0.07 wt %, and still further preferably 0.01 to 0.05 wt %;

<15> The polishing liquid composition according to any one of <1> to <14>, wherein a content of formaldehyde, which is a residual monomer of the water-soluble polymer is 0 ppm, or in a range of more than 0 ppm and not more than 10000 ppm, preferably 0 ppm, or in a range of more than 0 ppm and not more than 6000 ppm, more preferably 0 ppm, or in a range of more than 0 ppm and not more than 5000 ppm, still more preferably 0 ppm, or in a range of more than 0 ppm and not more than 3000 ppm, further more preferably 0 ppm, or in a range of more than 0 ppm and not more than 2000 ppm, and still further more preferably 0 ppm, or in a range of more than 0 ppm and not more than 1000 ppm;

<16> The polishing liquid composition according to any one of <1> to <15>, wherein a content of formaldehyde in the polishing liquid composition is 10 ppm or less, preferably 0.00 pm, or in a range of more than 0.00 pm and not more than 10.0 ppm, more preferably 0.00 ppm, or in a range of more than 0.00 ppm and not more than 5.0 ppm, still more preferably 0.00 ppm, or in a range of more than 0.00 ppm and not more than 4.0 ppm, further more preferably, 0.00 ppm, or in a range of more than 0.00 ppm and not more than 3.0 ppm, still further more preferably 0.00 ppm, or in a range of more than 0.00 ppm and not more than 1.0 ppm, still further more preferably 0.00 ppm, or in a range of more than 0.00 ppm and not more than 0.55 ppm, still further more preferably 0.00 ppm, or in a range of more than 0.00 ppm and not more than 0.5 ppm, still further more preferably 0.00 ppm, or in a range of more than 0.00 ppm and not more than 0.4 ppm, and still further more preferably 0.00 ppm, or in a range of more than 0.00 ppm and not more than 0.1 ppm;

<17> The polishing liquid composition according to any one of <1> to <16>, wherein the abrasive is colloidal silica, and the colloidal silica has an average particle size of 1 to 40 nm, preferably 5 to 37 nm, and more preferably 10 to 35 nm, based on scattering intensity distribution;

<18> The polishing liquid composition according to any one of <1> to <17>,
wherein a content of the abrasive in the polishing liquid composition is 0.5 wt % or more, preferably 1 wt % or more, more preferably 3 wt % or more, and further more preferably 4 wt % or more, as well as 20 wt % or less, preferably 15 wt % or less, more preferably 13 wt % or less, and further more preferably 10 wt % or less, that is, the content of the abrasive particles is 0.5 to 20 wt %, preferably 1 to 15 wt %, more preferably 3 to 13 wt %, and further more preferably 4 to 10 wt %<

19> The polishing liquid composition according to any one of <1> to <18>, further comprising an acid and/or a salt thereof, wherein the acid is preferably an inorganic acid or an organic phosphoric acid;

<20> The polishing liquid composition according to <19>, wherein the inorganic acid is nitric acid, sulfuric acid, hydrochloric acid, perchloric acid, or phosphoric acid;

<21> The polishing liquid composition according to <19> or <20>, wherein a content of the acid and/or the salt thereof in the polishing liquid composition is 0.001 to 5.0 wt %, preferably 0.01 to 4.0 wt %, more preferably 0.05 to 3.0 wt %, further more preferably 0.1 to 2.0 wt %, and still further more preferably 0.4 to 1.0 wt %;

<22> The polishing liquid composition according to any one of <1> to <21>, further comprising an oxidizing agent, wherein the oxidizing agent is preferably hydrogen peroxide;

<23> The polishing liquid composition according to <22>, wherein a content of the oxidizing agent in the polishing liquid composition is 0.01 wt % or more, preferably 0.05 wt % or more, and more preferably 0.1 wt % or more, as well as 4 wt % or less, preferably 2 wt % or less, and more preferably 1 wt % or less, that is, the content of the oxidizing agent in the polishing liquid composition is 0.01 to 4 wt %, preferably 0.05 to 2 wt %, and more preferably 0.1 to 1 wt %;

<24> The polishing liquid composition according to any one of <1> to <23>, wherein pH of the polishing liquid composition is 4.0 or less, preferably 3.5 or less, more preferably 3.0 or less, and further more preferably 2.5 or less, as well as 0.5 or more, preferably 0.8 or more, more preferably 1.0 or more, and further more preferably 1.2 or more, that is, the pH of the polishing liquid composition is preferably 0.5 to 4.0, more preferably 0.8 to 3.5, still more preferably 1.0 to 3.0, and further more preferably 1.2 to 2.5;

<25> A method for manufacturing a substrate, the method comprising:
performing polishing by supplying the polishing liquid composition according to any one of <1> to <24> to a surface to be polished of a substrate to be polished, bringing a polishing pad into contact with the surface to be polished, and moving the polishing pad and/or the substrate to be polished;

<26> The method for manufacturing a substrate according to <25>, wherein a surface member of the polishing pad has an average pore diameter of 50 µm or less, preferably 45 µm or less, more preferably 40 µm or less, and further more preferably 35 µm or less, as well as 0.01 µm or more, preferably 01 µm or more, more preferably 1 µm or more, and further more preferably 10 µm or more;

<27> The method for manufacturing a substrate according to <25> or <26>, wherein a polishing pressure in the polishing is 5.9 kPa or more, preferably 6.9 kPa or more, and more preferably 7.5 kPa or more, as well as 20 kPa or less, preferably 18 kPa or less, and more preferably 16 kPa or less, that is, the polishing pressure in the polishing is 5.9 to 20 kPa, preferably 6.9 to 18 kPa, and more preferably 7.5 to 16 kPa;

<28> The method for manufacturing a substrate according to <25> to <27>, wherein a supply rate at which the polishing liquid composition is supplied during the polishing is 0.05 to 15 mL/min, preferably 0.06 to 10 ml/min, more preferably 0.07 to 1 mL/min, and further more preferably 0.07 to 0.5 mL/min per 1 $cm^2$ of the surface to be polished of the substrate;

<29> A method for polishing a substrate, the method comprising:
performing polishing by supplying the polishing liquid composition according to any one of <1> to <24> to a surface to be polished of a substrate to be polished, bringing a polishing pad into contact with the surface to be polished, and moving the polishing pad and/or the substrate to be polished;

<30> The method for polishing a substrate according to <29>, wherein a surface member of the polishing pad has an average pore diameter of 50 µm or less, preferably 45 µm or less, more preferably 40 µm or less, and further more preferably 35 µm or less, as well as 0.01 µm or more, preferably 0.1 µm or more, more preferably 1 µm or more, and further more preferably 10 µm or more <31> The method for polishing a substrate according to <29> or <30>, wherein a polishing pressure in the polishing is 5.9 kPa or more, preferably 6.9 kPa or more, and more preferably 7.5 kPa or more, as well as 20 kPa or less, preferably 18 kPa or less, and more preferably 16 kPa or less, that is, the polishing pressure in the polishing is 5.9 to 20 kPa, preferably 6.9 to 18 kPa, and more preferably 7.5 to 16 kPa <32> The method for polishing a substrate according to any one of <29> to <31>, wherein a supply rate at which the polishing liquid composition is supplied during the polishing is 0.05 to 15 mL/min, preferably 0.06 to 10 ml/min, more preferably 0.07 to 1 mL/min, and further more preferably 0.07 to 0.5 mL/min per 1 $cm^2$ of the surface to be polished of the substrate.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A polishing liquid composition comprising an abrasive, a water-soluble polymer, and water, wherein the water-soluble polymer has a sulfonic acid group, and has an aromatic ring in each of a main chain and a side chain, and wherein the water-soluble polymer includes a constituent unit A that is a repeat unit having an aromatic ring in each of a main chain and a side chain thereof, the constituent unit A being expressed by a general formula (I) shown below:

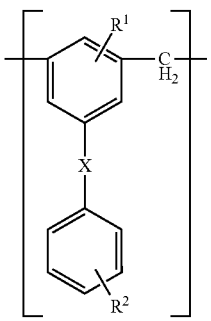

where
X represents —CH$_2$—, —S—, —SO$_2$—, —C(CH$_3$)$_2$—, or

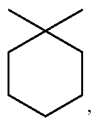,

R$^1$ and R$^2$ are identical or different to/from each other and each represents a hydrogen atom, an alkyl group, an alkoxy group, an aralkyl group, or —OM, and M is selected from the group consisting of alkali metals, alkali earth metals, organic cations, and a hydrogen atom.

2. The polishing liquid composition according to claim 1, wherein the water-soluble polymer is a water-soluble copolymer that includes:
   a constituent unit that is a repeat unit having an aromatic ring in each of a main chain and a side chain thereof; and
   a constituent unit that has a sulfonic acid group.

3. The polishing liquid composition according to claim 1, wherein the water-soluble polymer is a water-soluble polymer synthesized by addition condensation with formaldehyde.

4. The polishing liquid composition according to claim 1, wherein in the formula (I), X represents —SO$_2$— or —CH$_2$—.

5. The polishing liquid composition according to claim 1, wherein in the formula (I), R$^1$ and R$^2$ represent —OM each, and M represents sodium, potassium, ammonium, or a hydrogen atom.

6. The polishing liquid composition according to claim 1, wherein a content of the constituent unit A in entire constituent units composing the water-soluble copolymer is 5 to 70 mol %.

7. The polishing liquid composition according to claim 1, wherein the water-soluble polymer includes a constituent unit B having a sulfonic acid group, the constituent unit B being expressed by a general formula (II) shown below:

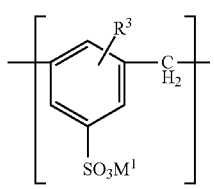

where
R$^3$ represents a hydrogen atom, an alkyl group, an alkoxy group, an aralkyl group, or —OM$^2$, and M$^1$ and M$^2$ are identical or different to/from each other, and are selected from the group consisting of alkali metals, alkali earth metals, organic cations, and a hydrogen atom.

8. The polishing liquid composition according to claim 7, wherein, in the formula (II), R$^3$ represents —OM$^1$, and M$^1$ represents sodium, potassium, ammonium, or a hydrogen atom.

9. The polishing liquid composition according to claim 7, wherein a content of the constituent unit B in entire constituent units composing the water-soluble copolymer is 30 to 95 mol %.

10. The polishing liquid composition according to claim 2, wherein a molar ratio between the constituent unit A and the constituent unit B in entire constituent units composing the water-soluble copolymer (constituent unit A/constituent unit B) is 70/30 to 5/95:
   where the constituent unit A is expressed by a general formula (I) shown below:

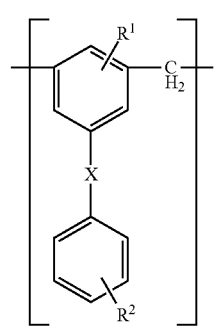

where
X represents —CH$_2$—, —S—, —SO$_2$—, —C(CH$_3$)$_2$—, or

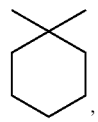,

R$^1$ and R$^2$ are identical or different to/from each other and each represents a hydrogen atom, an alkyl group, an alkoxy group, an aralkyl group, or —OM, and M is selected from the group consisting of alkali metals, alkali earth metals, organic cations, and a hydrogen atom, where the constituent unit B is expressed by a general formula (II) shown below:

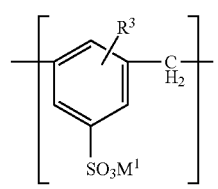

where
R$^3$ represents a hydrogen atom, an alkyl group, an alkoxy group, an aralkyl group, or —OM$^2$, and $M^1$ and $M^2$ are identical or different to/from each other, and are selected from the group consisting of alkali metals, alkali earth metals, organic cations, and a hydrogen atom.

11. The polishing liquid composition according to claim 1, wherein the water-soluble polymer has a surface tension of 45 to 100 mN/m.

12. The polishing liquid composition according to claim 1, wherein the water-soluble polymer has a weight-average molecular weight of 500 to 120000.

13. The polishing liquid composition according to claim 1, wherein a content of the water-soluble polymer in the polishing liquid composition is 0.001 to 1 wt %.

14. The polishing liquid composition according to claim 1 wherein a content of formaldehyde, which is a residual monomer of the water-soluble polymer is 0 ppm, or in a range of more than 0 ppm and not more than 10000 ppm.

15. The polishing liquid composition according to claim 1, wherein a content of formaldehyde in the polishing liquid composition is 10 ppm or less.

16. The polishing liquid composition according to claim 1, wherein the abrasive is colloidal silica, and the colloidal silica has an average particle size of 1 to 40 nm based on scattering intensity distribution.

17. The polishing liquid composition according to claim 1, wherein a content of the abrasive in the polishing liquid composition is 0.5 wt % or more.

18. The polishing liquid composition according to claim 1, further comprising an acid and/or a salt thereof, wherein the acid is an inorganic acid or an organic phosphonic acid.

19. The polishing liquid composition according to claim 18, wherein the inorganic acid is nitric acid, sulfuric acid, hydrochloric acid, perchloric acid, or phosphoric acid.

20. The polishing liquid composition according to claim 18, wherein a content of the acid and/or the salt thereof in the polishing liquid composition is 0.001 to 5.0 wt %.

21. The polishing liquid composition according to claim 1, further comprising an oxidizing agent.

22. The polishing liquid composition according to claim 21, wherein a content of the oxidizing agent in the polishing liquid composition is 0.01 wt % or more.

23. The polishing liquid composition according to claim 1, wherein pH of the polishing liquid composition is 4.0 or less.

24. The polishing liquid composition according to claim 1, wherein in the formula (I), X represents —$SO_2$— or —$CH_2$—, $R^1$ and $R^2$ represent —OM each, and M represents sodium, potassium, ammonium, or a hydrogen atom.

25. A method for manufacturing a substrate, the method comprising:
performing polishing by supplying the polishing liquid composition according to claim 1 to a surface to be polished of a substrate to be polished, bringing a polishing pad into contact with the surface to be polished, and moving the polishing pad and/or the substrate to be polished.

26. The method for manufacturing a substrate according to claim 25, wherein a surface member of the polishing pad has an average pore diameter of 50 μm or less.

27. The method for manufacturing a substrate according to claim 25, wherein a polishing pressure in the polishing is 5.9 kPa or more.

28. The method for manufacturing a substrate according to claim 25, wherein a supply rate at which the polishing liquid composition is supplied during the polishing is 0.05 to 15 mL/min per 1 $cm^2$ of the surface to be polished of the surface to be polished of the substrate.

29. A method for polishing a substrate, the method comprising:
performing polishing by supplying the polishing liquid composition according to claim 1 to a surface to be polished of a substrate to be polished, bringing a polishing pad into contact with the surface to be polished, and moving the polishing pad and/or the substrate to be polished.

30. The method for polishing a substrate according to claim 29, wherein a surface member of the polishing pad has an average pore diameter of 50 μm or less.

31. The method for polishing a substrate according to claim 29, wherein a polishing pressure in the polishing is 5.9 kPa or more.

32. The method for polishing a substrate according to claim 29, wherein a supply rate at which the polishing liquid composition is supplied during the polishing is 0.05 to 15 mL/min per 1 $cm^2$ of the surface to be polished of the substrate.

* * * * *